Aug. 19, 1941.                J. S. PARSONS                    2,253,394
                         NETWORK DISTRIBUTION SYSTEM
                            Filed Aug. 18, 1939
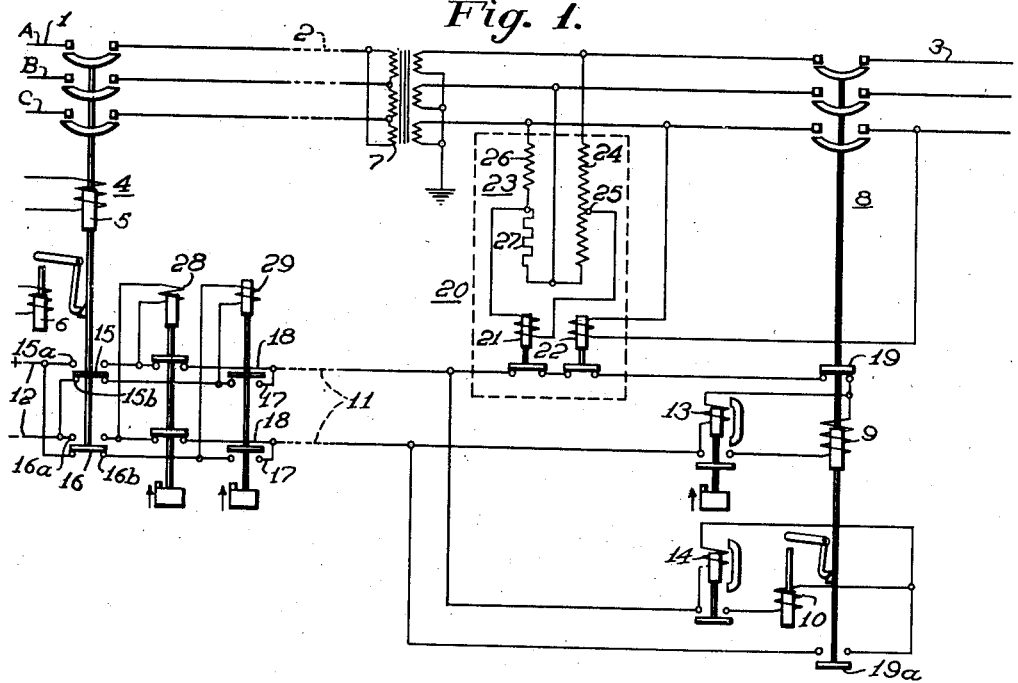
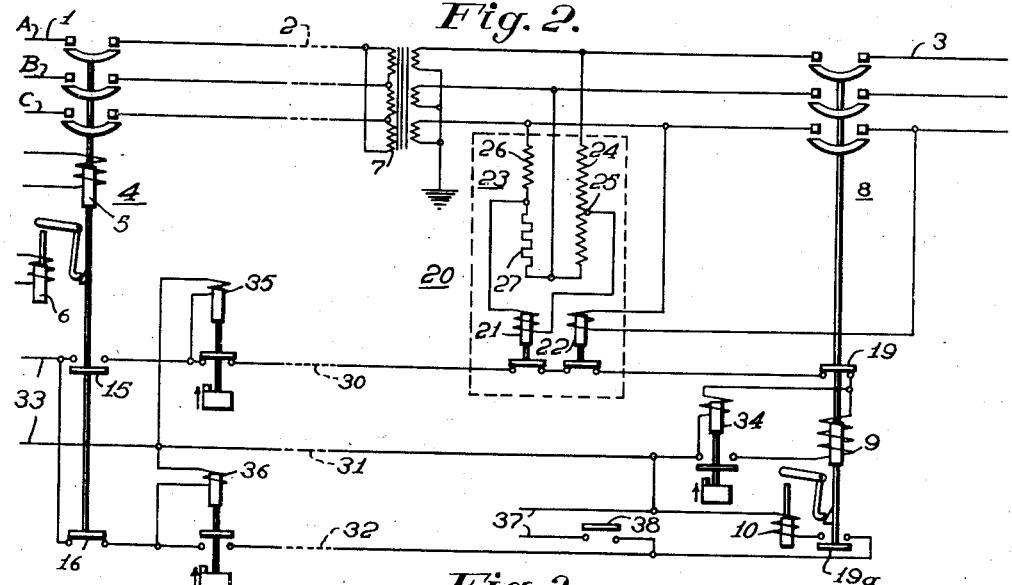
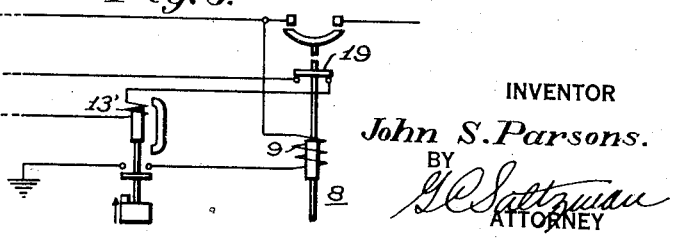
WITNESSES:
INVENTOR
John S. Parsons.
BY
ATTORNEY Patented Aug. 19, 1941

2,253,394

UNITED STATES PATENT OFFICE 2,253,394

NETWORK DISTRIBUTION SYSTEM

John S. Parsons, Swissvale, Pa., assignor to Westinghouse Electric & Manufacturing Company, East Pittsburgh, Pa., a corporation of Pennsylvania Application August 18, 1939, Serial No. 290,808

14 Claims. (Cl. 171—97)

This invention relates to network distribution systems and it has particular relation to network distribution systems in which pilot wires are employed for controlling network circuit breakers from a distant point.

It has been proposed heretofore to employ pilot wire control for network distribution systems. In some of the systems that have been suggested in the past, a pilot wire circuit has been controlled by a condition of the feeder circuit breaker to open or close network circuit breakers associated with the feeder circuit breaker. Such systems are objectionable for the reason that it is possible for network circuit breakers to close despite the fact that the voltages across their poles are improper. That is, these network circuit breakers will close even though two conductors of the feeder have been transposed during repairs, or if all three feeder conductors of a three-phase circuit have been rotated 120° or 240°. Under these conditions serious damage can result.

In accordance with my invention, the network circuit breakers associated with the feeder circuit breaker are controlled by the condition of the feeder circuit breaker in order to prevent the closure of the network circuit breakers. To care for those cases in which the voltage conditions across the poles of the network circuit breakers are improper, I provide suitable relays which prevent closure of the network circuit breakers under these circumstances. Such relays may operate in response to the rise of a negative sequence voltage component above a predetermined value or to the increase of a voltage across a pole of a network circuit breaker above a predetermined value to open the closing circuit for the network circuit breaker. Until the conditions causing these abnormal voltages to appear are corrected, the network circuit breakers controlled in this manner cannot be reclosed.

It is therefore an object of my invention to provide a pilot wire control system for a network distribution system which is not subject to improper operation.

It is another object of my invention to provide a pilot wire controlled closing circuit for a network circuit breaker which cannot be operated if the voltages across the poles of the network circuit breaker are improper.

It is a further object of my invention to provide a pilot wire control system for a network circuit breaker which cannot be placed in operative condition if a negative sequence voltage component of the network feeder is above a predetermined value, or the voltage across a pole of the network circuit breaker is above a predetermined value.

It is another object of my invention to provide full pilot wire control for a network circuit breaker with a minimum number of pilot wire conductors.

It is still another object of my invention to provide a direct current pilot wire control for a network circuit breaker employing polarized relays.

Other objects of my invention will be apparent from the following description taken in conjunction with the accompanying drawing in which:

Figure 1 is a diagrammatic view of a network distribution system embodying my invention;

Fig. 2 is a diagrammatic view of a network distribution embodying a modified form of my invention; and Fig. 3 is a diagrammatic view of a further modification of my invention.

Referring to the drawing, Fig. 1 shows a portion of a typical network distribution system. In the specific embodiment illustrated, a three-phase system is disclosed comprising three phase conductors A, B and C. These phase conductors are divided into a number of different portions. A first portion corresponds to a station bus 1, a second portion corresponds to a feeder circuit 2 and a third portion corresponds to a network distribution circuit 3. The station bus 1 and the feeder circuit 2 are connected and disconnected by means of a feeder circuit breaker 4 which is provided with a closing motor or solenoid 5 and a tripping solenoid 6 which may be controlled by suitable switches or relays in a manner well known in the art. As usually employed, relays are provided for actuating the tripping solenoid 6 to trip the feeder circuit breaker 4 when a fault occurs on the feeder circuit 2.

Between the feeder circuit 2 and the network distribution circuit 3, a network transformer 7 is interposed for exchanging energy between these two circuits. For this purpose a transformer may be provided with a delta-connected primary and a star-connected secondary with the neutral point of the star connection grounded. Although this is a common connection for the transformer, other well known connections may be employed in its place.

Connection and disconnection of the secondary of the transformer 7 with respect to the network distribution circuit 3 is effected by a network circuit breaker 8. Although only one network transformer 7, one network circuit breaker 8 and one network distribution circuit 3 are disclosed in Fig. 1, it is to be understood that in practice, a number of similar feeder circuits, a number of transformers, and network circuit breakers are connected in parallel to supply the common network distribution circuit or grid 3. Since the additional elements would be similar to those disclosed in Fig. 1, they have been omitted for the purpose of simplicity.

For actuating the network circuit breaker 8, a closing motor or solenoid 9 and a tripping solenoid 10 are associated with the network circuit breaker in the usual manner. The closing solenoid 9 and tripping solenoid 10 are to be controlled from a point adjacent the feeder circuit breaker 4 by means of a pilot wire circuit 11 which, in the embodiment illustrated in Fig. 1, is energized from a direct current source 12. In some cases, a single pilot wire conductor and ground may constitute the pilot wire circuit 11. As illustrated two conductors are employed.

It is desirable to control the network circuit breaker 8 with a minimum number of pilot wire conductors. To this end, I employ a pair of polarized relays 13 and 14. The pilot wire circuit 11 may be normally energized in which case relays having back contacts would be employed. With such energization, when the network circuit breaker is to be closed its closing relay is deenergized. Under these conditions the closing relay drops to engage its contacts and connect the solenoid 9 to a source of energy. Similarly, when the network circuit breaker is to be tripped, its tripping relay is deenergized to engage its contacts and connect the solenoid 10 to a source of energy. However, I prefer a normally deenergized pilot wire circuit which now will be described.

When a direct current source having a predetermined polarity is connected to the pilot wire 11 the polarized relay 13 is actuated to close its contacts, whereas the polarized relay 14 is polarized in the reverse direction so that it does not close its contacts under these conditions. When the polarity of the direct current source connected to the pilot wire 11 is reversed, the polarized relay 14 is actuated to close its contacts, whereas the polarized relay 13 remains in its deenergized position. Consequently, the polarized relay 13 may be employed for controlling the operation of the closing solenoid 9 and the polarized relay 14 may be employed for controlling the energization of the tripping solenoid 10 with only two conductors required for the pilot wire circuit.

Reversal of the connections between the direct current source 12 and the pilot wire circuit 11 is effected by operation of the feeder circuit breaker 4. For this purpose the feeder circuit breaker 4 is provided with two pallet switches 15 and 16, each of which engages a first set of contacts 15a and 16a when the circuit breaker is in its closed condition and a second set of contacts 15b and 16b when the feeder circuit breaker is in its open condition. With the feeder circuit breaker in its open condition as illustrated in Fig. 1, the pilot wire circuit 11 is connected to the direct current source 12 through the conductors 17, and when the feeder circuit breaker 4 is in its closed condition, the pilot wire circuit 11 is connected to the direct current source 12 through the conductors 18. By reference to Fig. 1, it will be noted that in these two conditions of the feeder circuit breaker 4, the connections of the direct current source 12 to the pilot wire circuit 11 are reversed.

Going a step further, the closure of the feeder circuit breaker 4 is employed to complete an energizing circuit for the pilot wire circuit 11 such that the polarized relay 13 is energized to close its contacts for energizing the closing solenoid 9. It will be noted that when the polarized relay 13 closes its contacts, the closing solenoid 9 is connected directly across the pilot wire circuit through a pallet switch 19 on the network circuit breaker 8. Although a separate source of energy could be connected to the closing solenoid 9 by operation of the polarized relay 13, if the pilot wire circuit is capable of handling sufficient current to actuate all of the closing solenoids of all of the network circuit breakers associated with the feeder circuit 2, the connections illustrated in Fig. 1 may be employed.

With the construction thus far described, it will be noted that the network circuit breaker 8 will close whenever the feeder circuit breaker 4 closes, regardless of the condition of the feeder circuit 2, that is, the network circuit breaker 8 will close even though two conductors of the feeder circuit 2 are transposed or all conductors of the feeder circuit 2 are rotated 120° or 240°. As above indicated, closure under these conditions may result in considerable damage to the network distribution system and is objectionable.

In order to prevent closure under these conditions, a relay unit 20 is employed for preventing closure if the voltages across the poles of the network circuit breaker 8 are incorrect. The relay unit 20 includes a first voltage relay 21 which is responsive to a negative sequence component of the voltage in the feeder circuit 2, and a second voltage relay 22 which is responsive to the voltage across one pole of the network circuit breaker 8.

If two conductors of the feeder circuit 2 are transposed, the negative sequence voltage applied to the relay 21 will rise above a predetermined value which may be 25% of the normal positive sequence voltage present and actuates the relay 21 to open its back contacts. If all of the conductors of the feeder circuit 2 are transposed 120° or 240°, the voltage applied to the voltage relay 22 will rise above a predetermined value which may be 140% of the normal line to neutral network voltage to open its back contacts. When either of the contacts controlled by the relays 21 and 22 are open, the closing circuit for the closing solenoid 9 is interrupted and the network circuit breaker 8 cannot be closed under these conditions. The relays 21 and 22 may be designed to drop and close their contacts when their respective energizing voltages drop to 15% and 115%, respectively, of the normal line-to-neutral voltage.

Energization in accordance with a negative sequence component of voltage may be applied to the relay 21 by means of a negative sequence voltage filter 23, which may be of any suitable type, but preferably is of the type illustrated and described in the Lenehan Patent No. 1,936,797, issued November 28, 1933, and assigned to the Westinghouse Electric & Manufacturing Company. This filter includes an auto-transformer 24 which is connected across the phase conductors A and B and which has a 40% tap 25. The filter also includes a reactor 26 and a resistor 27 so proportioned that the voltage drop across the resistor is 40% of the total voltage drop across the reactor 26 and the resistor 27 in series, and the voltage drop across the resistor 27 lags this total voltage drop across the reactor 26 and the resistor 27 in series by 60°. With the filter designed as indicated and connected as illustrated in Fig. 1, assuming that the phase rotation is in the order A, B, C, the output of the negative sequence voltage filter 23 which is supplied to the relay 21 will be proportional to the negative sequence voltage present in the feeder circuit 2. Further details concerning the design and operation of the voltage filter may be obtained by reference to the aforesaid Lenehan patent.

It will be noted that the polarized relay 14 and the tripping solenoids 10 are not subject to the control of the relays 21 and 22 for the reason that they are connected to the pilot wire circuit 11 on the pilot wire circuit side of the relays. Consequently, the network circuit breaker 8 may be tripped at any time regardless of the position of the relays 21 and 22. As explained in connection with the closing solenoid, the tripping solenoid 10 may be connected to a separate energizing source through the contacts of the polarized relay 14, but here again if the capacity of the source 12 and the pilot wire circuit 11 is adequate the solenoid may be connected directly to the pilot wire circuit 11 through the polarized relay 14 as illustrated in Fig. 1. A pallet switch 19a is provided on the network circuit breaker for controlling the tripping circuit.

In order to give the relays 21 and 22 ample time for responding to any improper voltage condition of the feeder circuit 2, I prefer to provide the polarized relay 13 with a time delay in its closing direction. Such a time delay may be of the order of 1 to 5 seconds, depending upon the speed of response of the relays 21 and 22.

Although the system thus far described is fully operative, under certain conditions it may be desirable to deenergize completely the pilot wire circuit 11 after the operation of the closing solenoid 9 or the tripping solenoid 10. To this end the pilot wire circuit 11 may be energized through a pair of timing relays 28 and 29 which control the connection of the pilot wire circuit to the direct current source. It will be noted that the timing relay 28 controls contacts located in the conductors 18, whereas the timing relay 29 controls contacts located in the conductors 17. The actuating coil for the timing relay 28 is energized in accordance with the voltage across the conductors 18, whereas the actuating coil for the timing relay 29 is energized in accordance with the voltage across the conductor 17.

In the position of the parts illustrated in Fig. 1, the direct current source 12 is connected through the pallet switches 15 and 16 to the conductors 17. With this connection the actuating coil for the timing relay 29 is energized and for this reason the contacts of the timing relay 29 are illustrated in their open conditions. Following this a step further, the actuating coil for the relay 28 is in the deenergized condition with its contacts closed. With the parts in the positions illustrated in Fig. 1, the pilot wire circuit 11 is completely deenergized.

When the feeder circuit breaker 4 is actuated from the position illustrated in Fig. 1 to its closed condition, the pilot wire circuit 11 is connected through the conductors 18 and the contacts of the timing relay 28 and the pallet switches 15, 16 to the direct current source 12. At the same time, the actuating coil for the timing relay 28 is energized from the direct current source 12. At the expiration of a time sufficient to assure the closing of all network circuit breakers controlled by the pilot wire circuit 11, the timing relay 20 opens its contacts to deenergize the pilot wire circuit. For example, the timing interval may be of the order of 10 seconds. At the same time, the actuating coil for the timing relay 29 is deenergized and the contacts of this timing relay close to condition the pilot wire circuit for a subsequent tripping operation.

Assuming that both circuit breakers 4 and 8 are closed, and that the timing relay 28 is in its energized condition with the timing relay 29 in its deenergized condition, if it becomes necessary for any reason to trip the feeder circuit breaker 4, a circuit will be established from the source 12 to the pilot wire circuit 11 through the pallet switches 15 and 16, the contacts of the timing relay 29 and the conductors 17. The energization of the pilot wire circuit 11 will be of such a polarity that the polarized relay 14 is actuated to close its front contacts and connect the tripping solenoid 10 to the pilot wire circuit 11 for a tripping operation. At the expiration of a time interval sufficient to assure the tripping of all network circuit breakers associated with the feeder circuit 2, the timing relay 29, which has been energized at the same time, opens its contacts to deenergize the pilot wire circuit 11. As the pilot wire circuit 11 is deenergized, the timing solenoid 28 drops to close its contacts and condition the pilot wire circuit 11 for a subsequent closing operation. At this stage the parts are again in the position illustrated in Fig. 1.

It is believed that the operation of the apparatus thus far described is apparent from the foregoing description. With the parts in the positions illustrated in Fig. 1 the feeder circuit 2 is completely deenergized and may be repaired if necessary. Also, the pilot wire circuit 11 is completely deenergized and may be repaired or serviced as desired. If it is desired to replace the feeder circuit 2 in operation, the feeder circuit breaker 4 is actuated to its closed condition by energization of its closing solenoid 5. When this happens, the pallet switches 15 and 16 are moved to complete an energizing circuit for the pilot wire circuit 11 through the conductors 18. The energization of the pilot wire circuit 11 is accompanied by the energization of the actuating coil for the timing relay 28 and the actuating coil for the polarized relay 13. Since both of the relays 28 and 13 are provided with time delay, nothing occurs until the expiration of one of these time delays. During this interval, if either of the relays 21 or 22 opens its contacts because of the presence of a negative sequence voltage component or a voltage across one of the poles of the network circuit breaker 8 which is in excess of predetermined values, the closing solenoid 9 will not be energized. But if the relays 21 and 22 remain closed, signifying that the voltages across the poles of the network circuit 8 are correct, the polarized relay 13 at the expiration of its time delay will close its contacts to energize the closing solenoid 9 and complete the introduction of the feeder circuit 2 into the network distribution system.

After the expiration of a still further time, the timing relay 28 opens its contacts to deenergize the pilot wire circuit 11 and the timing relay 29 being disconnected closes its contacts to condition the pilot wire circuit for a subsequent tripping operation.

When it becomes necessary to remove the feeder 2 from service, the feeder circuit breaker is tripped by actuation of its tripping solenoid 6. In tripping, the feeder circuit breaker, through its pallet switches 15 and 16, completes a circuit between the direct current source 12 and the pilot wire circuit 11 through the conductors 17. This energization of the pilot wire circuit 11 is of proper polarity to cause actuation of the polarized relay 14 which engages its front contacts to place the tripping solenoid 10 across the pilot wire circuit 11 and trip the network circuit breaker 8. When this happens, the feeder circuit 2 is completely removed from the network distribution system. At the expiration of a time interval for which the timing relay 29 is set, the relay operates to open its contacts and deenergizes the pilot wire circuit 11. At the same time the timing relay 28 is deenergized and closes its contacts to condition the pilot wire 11 for a subsequent closing operation. At this stage the parts have returned to the position illustrated in Fig. 1.

In Fig. 2 I have illustrated a network distribution system provided with a pilot wire control circuit which may be energized by either alternating current or direct current. Aside from the pilot wire circuit itself, the various elements illustrated in Fig. 2 are the same as those illustrated in Fig. 1. The pilot wire circuit of Fig. 2 comprises three conductors 30, 31 and 32. Closure of the network circuit breaker 8 in Fig. 2 is controlled by the energization of the conductors 30 and 31 through the pallet switch 15 which connects the conductor 30 to one terminal of an alternating current or direct current source 33. Tripping of the network circuit breaker 8 is controlled by the energization of the conductors 31 and 32 through the pallet switch 16 which connects the conductor 32 to one terminal of the source 33. Since separate circuits are employed for tripping and closing control, it is unnecessary to employ polarized or selective relays in Fig. 2. Consequently a simple voltage-type closing relay 34 replaces the polarized relay 13 of Fig. 1 and operates when energized to connect the closing solenoid 9 to the pilot wire circuit made up of conductors 30 and 31. The tripping solenoid 10 in Fig. 2 is shown connected directly across the pilot wire made up of the conductors 31 and 32. The pilot switch 19a mounted on the circuit breaker 8 controls the connection of the tripping solenoid 10 to the pilot wire circuit.

Referring now to the operation of the circuit illustrated in Fig. 2, the circuit breakers 4 and 8 both are illustrated in their open conditions. When it is desired to reintroduce the feeder circuit 2 in the network system, the feeder circuit breaker 4 is operated to its closed position. When this happens the pallet switch 15 connects the conductor 30 to one terminal of the source 33. Through the conductors 30 and 31, the source 33 is connected across the actuating coil for the timing relay 34 which may have a time delay of the order of 1 to 5 seconds. If neither of the relays 21 nor 22 opens its contacts during the time required for the relay 34 to close its contacts, the closing solenoid 9 is connected across the source 33 through the pilot wire circuit made up of the conductors 30 and 31, and the network circuit breaker 8 closes to introduce the feeder circuit 2 into the network distribution system.

When it becomes necessary to remove the feeder circuit 2 from the network distribution system, the feeder circuit breaker 4 of Fig. 2 is tripped. In tripping, the feeder circuit breaker 4 through its pallet switch 16 connects the pilot wire conductor 32 to one terminal of the source 33 and thus establishes a circuit for the tripping solenoid 10. Consequently, the network circuit breaker 8 is tripped into its open condition and the parts now are in the positions illustrated in Fig. 2.

If desired, provision may be made to deenergize the pilot wire conductors 30, 31 and 32 in a manner similar to that described for Fig. 1. To that end two timing relays 35 and 36 are provided which correspond to the timing relays 28 and 29 of Fig. 1. When a pilot wire circuit made up of the two conductors 30 and 31 is completed through the pallet switch 15, the timing relay 35 is energized and at the expiration of its time delay opens to deenergize the pilot wire circuit. At the same time, the timing relay 36 is deenergized and closes its contacts to condition the pilot wire circuit for a tripping operation.

When the feeder circuit breaker 4 is tripped, a pilot wire circuit is established including conductors 31 and 32 through operation of the pallet switch 16. Also the timing relay 36 is energized, and at the end of its time delay opens its contacts to deenergize the pilot wire circuit. At the same time the timing relay 35 is deenergized and closes its contacts to condition the pilot wire circuit for a subsequent closing operation. At this stage the parts are again in the positions illustrated in Fig. 2.

Although the pilot wire circuit alone may be relied upon for tripping purposes, if desired the tripping solenoid 10 of the network circuit breaker may be tripped from an independent energizing source 37 through operation of one or more relay contacts 38. For example, the relay contact 38 may be the contact of a conventional reverse current relay which actuates the contact 38 to its closed position whenever a reversal of energy occurs in the network distribution system. That is, when energy flows from the network distribution circuit 3 to the feeder circuit 2, the contact 38 is actuated to its closed condition.

As above indicated, the relays 13, 14, 34 may connect a separate energizing source to the closing and tripping solenoids 9, 10. A typical example of this modification is illustrated in Fig. 3, wherein the circuit breaker 8, closing solenoid 9, trip circuit 11 and pallet switch 19 are associated with a relay 13' which corresponds to the relay 13 of Fig. 1. However, the contacts of the relay 13' are employed for controlling a circuit extending from one of the conductors c on the secondary side of the transformer 7 through the solenoid 9 and the relay contacts to ground. Consequently, closure of the relay contacts places the voltage from the conductor c to ground across the solenoid 9.

Although I have described my invention with reference to certain specific embodiments thereof, it is evident that numerous modifications thereof are possible. Therefore, I do not wish my invention to be restricted except as required by the scope of the appended claims when interpreted in view of the prior art.

I claim as my invention:

1. In a polyphase alternating current network distribution system, a feeder circuit breaker, a network circuit breaker, a polyphase feeder circuit for supplying energy from said feeder circuit breaker to said network circuit breaker, operating means for said network circuit breaker, pilot wire means operable adjacent said feeder circuit breaker for actuating said operating means to close said network circuit breaker, and means effective when the phase conditions across the poles of said network circuit breaker are incorrect for preventing operation of said operating means.

2. In a polyphase alternating current network distribution system, a feeder circuit breaker, a network circuit breaker, a polyphase feeder circuit for supplying energy from said feeder circuit breaker to said network circuit breaker, operating means for said network circuit breaker, pilot wire means operable adjacent said feeder circuit breaker and effective a predetermined time after operation thereof for actuating said operating means to close said network circuit breaker, and means effective when the phase conditions across the poles of said network circuit breaker are incorrect for preventing operation of said operating means.

3. In a network distribution system, a feeder circuit breaker, a network circuit breaker, a feeder circuit for supplying energy from said feeder circuit breaker to said network circuit breaker, operating means for said network circuit breaker, a pilot wire control circuit extending from said operating means to a point adjacent said feeder circuit breaker, actuating means adjacent said feeder circuit breaker for actuating said operating means through said pilot wire control circuit to close said network circuit breaker, means effective when the phase conditions across the poles of said network circuit breaker are incorrect for preventing closure of said network circuit breaker, and tripping means for said network circuit breaker controlled through said pilot wire control circuit, said tripping means being operable regardless of the condition of said closure preventing means.

4. In a network distribution system, a feeder circuit breaker, a network circuit breaker, a feeder circuit for supplying energy from said feeder circuit breaker to said network circuit breaker, operating means for said network circuit breaker, a pilot wire control circuit extending from said operating means to a point adjacent said feeder circuit breaker, actuating means adjacent said feeder circuit breaker for actuating said operating means through said pilot wire control circuit to close said network circuit breaker, said actuating means being operable for effecting closure of said network circuit breaker only after a predetermined time following closure of said feeder circuit breaker, means effective when the phase conditions across the poles of said network circuit breaker are incorrect for preventing closure of said network circuit breaker, and tripping means for said network circuit breaker controlled through said pilot wire control circuit, said tripping means being operable regardless of the condition of said closure preventing means.

5. In a polyphase network distribution system, a feeder circuit breaker, a network circuit breaker, a polyphase feeder circuit for transmitting energy from said feeder circuit breaker, operating means for said network circuit breaker, a pilot wire control circuit extending from said operating means to a point adjacent said feeder circuit breaker and operable for effecting a closure operation of said network circuit breaker, and means for preventing closure of said network circuit breaker responsive to a symmetrical phase sequence component derived from said polyphase feeder circuit.

6. In a polyphase network distribution system, a feeder circuit breaker, a network circuit breaker, a polyphase feeder circuit for transmitting energy from said feeder circuit breaker, operating means for said network circuit breaker, a pilot wire control circuit extending from said operating means to a point adjacent said feeder circuit breaker and operable for effecting a closure operation of said network circuit breaker, means for introducing a time delay between the closure of said feeder circuit breaker and the operation of said pilot wire control circuit for closing said network circuit breaker, and means for preventing closure of said network circuit breaker responsive to a negative symmetrical phase sequence voltage component derived from said polyphase feeder circuit.

7. In a polyphase network distribution system, a feeder circuit breaker, a network circuit breaker, a polyphase feeder circuit for transmitting energy from said feeder circuit breaker, operating means for said network circuit breaker, a pilot wire contol circuit extending from said operating means to a point adjacent said feeder circuit breaker and operable for effecting a closure operation of said network circuit breaker, means for introducing a time delay between the closure of said feeder circuit breaker and the operation of said pilot wire control circuit for closing said network circuit breaker, and means for preventing closure of said network circuit breaker responsive to a negative symmetrical phase sequence voltage component derived from said polyphase feeder circuit, and responsive to the voltage difference across a pole of said network circuit breaker.

8. In a network distribution system, a circuit breaker, pilot wire remote control switch means for said circuit breaker comprising a source of direct current, polarized relay means operable into a circuit breaker tripping condition or a circuit breaker closing condition in accordance with the polarity of the energization thereof, reversing switch means for connecting said direct current source to said polarized relay means through said pilot wire circuit, and means effective when said reversing switch is in circuit breaker closing position for preventing closure of said circuit breaker when the polarity across a pole of said circuit breaker is incorrect.

9. In a polyphase network distribution system, a feeder circuit breaker, a network transformer, a polyphase feeder circuit for connecting said feeder circuit breaker to the primary of said transformer, a polyphase network circuit, a network circuit breaker for connecting said network circuit to the secondary of said transformer, polarized means operable into a network circuit breaker tripping condition or into a network circuit breaker closing condition in accordance with the polarity of the energization thereof, a pilot wire circuit extending between said network circuit breaker and said feeder circuit breaker for energizing said polarized means, a source of direct current, reversing switch means for connecting said direct current source to said pilot wire circuit for controlling the energization of said polarized means, and means responsive to a phase sequence component of the voltage of said network transformer for preventing closure of said network circuit breaker by operation of said polarized means.

10. In a polyphase network distribution system, a feeder circuit breaker, a network transformer, a polyphase feeder circuit for connecting said feeder circuit breaker to the primary of said transformer, a polyphase network circuit, a network circuit breaker for connecting said network circuit to the secondary of said transformer, polarized means operable into a network circuit breaker tripping condition or into a network circuit breaker closing condition in accordance with the polarity of the energization thereof, a pilot wire circuit extending between said network circuit breaker and said feeder circuit breaker for energizing said polarized means, a source of direct current, reversing switch means for connecting said direct current source to said pilot wire circuit for controlling the energization of said polarized means, and closure control means responsive to a phase sequence component of the voltage of said network transformer for preventing closure of said network circuit breaker by operation of said polarized means, said closure control means comprising a negative phase sequence voltage filter connected for energization from said feeder circuit, and means responsive to the output of said voltage filter and to the voltage across a pole of said network circuit breaker for interrupting said network circuit breaker closing condition.

11. In a network distribution system, a feeder circuit breaker, a network circuit breaker, a feeder circuit for supplying energy from said feeder circuit breaker to said network circuit breaker, operating means for said network circuit breaker, a pilot wire control circuit extending from said operating means to a point adjacent said feeder circuit breaker, actuating means adjacent said feeder circuit breaker for actuating said operating means through said pilot wire control circuit to close said network circuit breaker, means effective when the phase conditions across the poles of said network circuit breaker are incorrect for preventing closure of said network circuit breaker, and means for deenergizing said pilot wire circuit after the lapse of a time sufficient for an actuation of said operating means.

12. In a network distribution system, a feeder circuit breaker, a network circuit breaker, a feeder circuit for connecting said network circuit breaker to said feeder circuit breaker, means for controlling said network circuit breaker including polarized relay means operable into a circuit breaker tripping condition or a circuit breaker closing condition in accordance with the polarity of energization thereof, a two-conductor pilot wire circuit extending between a point adjacent said feeder circuit breaker and a point adjacent said network circuit breaker, and selective means for selectively energizing said relay means through said pilot wire circuit with a polarity for operating said polarized relay means into circuit breaker tripping condition or a polarity for operating said polarized relay means into circuit breaker closing condition.

13. In a network distribution system, a feeder circuit breaker, a network circuit breaker, a feeder circuit for connecting said network circuit breaker to said feeder circuit breaker, means for controlling said network circuit breaker including polarized relay means operable into a circuit breaker tripping condition or a circuit breaker closing condition in accordance with the polarity of energization thereof, a two-conductor pilot wire circuit extending between a point adjacent said feeder circuit breaker and a point adjacent said network circuit breaker, and selective means for selectively energizing said relay means through said pilot wire circuit with a polarity for operating said polarized relay means into circuit breaker tripping condition or a polarity for operating said polarized relay means into circuit breaker closing condition, said selective means including a source of direct current and a reversing switch controlled by the condition of said feeder circuit breaker for operatively connecting said source of direct current to said pilot wire circuit.

14. In an alternating current network distribution system, a feeder circuit breaker, a source of alternating current energy associated with said feeder circuit breaker, an electrical switch, a feeder circuit for supplying electrical energy from said feeder circuit breaker to said switch, operating means effective when actuated for selectively opening and closing said switch, pilot wire means operable adjacent said feeder circuit breaker for actuating said operating means to close said switch, and means effective when the phase conditions across the poles of said network switch are incorrect for preventing a closing operation of said operating means.

JOHN S. PARSONS.